United States Patent [19]
Gandini et al.

[11] Patent Number: 5,369,635
[45] Date of Patent: Nov. 29, 1994

[54] HIGH BIT RATE CELL SWITCHING ELEMENT IN CMOS TECHNOLOGY

[75] Inventors: Marco Gandini, Turin; Luigi Licciardi, Vercelli; Maura Turolla, Almese; Vinicio Vercellone, Venaria, all of Italy

[73] Assignee: Cselt-Centro Studi e Laboratori Telecommunicazioni S.P.A., Turin, Italy

[21] Appl. No.: 27,335

[22] Filed: Mar. 8, 1993

[30] Foreign Application Priority Data

Mar. 17, 1992 [IT] Italy ................. TO92 A 000223

[51] Int. Cl.⁵ ................................. H04L 12/56
[52] U.S. Cl. ...................... 370/60.1; 370/100.1
[58] Field of Search .............. 370/60, 94.1, 60.1, 370/100.1, 108, 94.2

[56] References Cited
U.S. PATENT DOCUMENTS
5,157,654 10/1992 Cisneros ........................... 370/60

OTHER PUBLICATIONS
32×32 Shared Buffer Type ATM Switch VLSIS for B-ISDN by Takahiko Kozaki et al., Hitachi VLSI Engr. Corp. 1991.
ISSC91/Session 14 Telecommunication Circuits Paper FA 14.5 1991 IEEE International Solid-State Circuits Conference, Tanaka et al.

Primary Examiner—Wellington Chin
Assistant Examiner—Min Jung
Attorney, Agent, or Firm—Herbert Dubno

[57] ABSTRACT

The switching element allows building up of ATM exchanges capable of processing cell flows at bit rates higher than 700 Mbit/s. It uses an architecture with output queues, implemented through a unique shared memory, suitably controlled in order to obtain spatial cell switching towards the outputs. ATM cells are converted into a highly parallel format by a structure named rotation memory, where through the cells are then transferred into the master memory. The rotation memory is used also for the inverse operations of format restoration towards the output. The element control circuit is entrusted with the generation of writing and reading addresses of the master memory, in order to carry out the switching proper.

3 Claims, 5 Drawing Sheets

HIGH BIT RATE CELL SWITCHING ELEMENT IN CMOS TECHNOLOGY

FIELD OF THE INVENTION

Our present invention relates to telecommunications systems using digital signals for transmitting speech, video and data signals and, more particularly, to a high bit rate cell switching element in CMOS technology.

BACKGROUND OF THE INVENTION

Fast cell switching technique, the so called ATM, after the English acronym "Asynchronous Transfer Mode", are playing an increasingly important part in the integrated switching of digital flows of services for the transmission of speech, video and data signals with different bandwidth requirements and traffic characteristics.

The ATM technique is to date universally considered the solution for implementing broadband ISDN, the so-called B-ISDN. It is an efficient fast-packet switching technique dealing with predetermined length entities, referred to as cells, and combining the advantages offered by conventional circuit and packet switching techniques.

Hence such a technique allows, thanks to the flexibility inherent in packet switching, processing of any type of information through a single switching technique within an integrated network structure which can be independent of bit rate, and hence can be capable of dealing with variable bit-rate connections.

The resources offered by the switching system are not strictly dedicated to a single call for its whole duration, as in circuit switching systems, but are used only at the instant at which there is the necessity of transmitting information.

As is known, this technique requires that information relevant to the various services be organized in adjacent units or cells with a fixed length of about 400 bits. They are composed of an information field and of a header field, the so called label, which carries the information necessary for routing through the connection network and other service information.

The cells are received by line interfaces at the input of a switching node, basically consisting of a control part and of a structure which effects the switching proper. The control part carries out all the high level functions relevant to call processing, to connection network configuration and accessory service control.

Among these functions, one of the most important is the choice of the path through the network. This path is determined at the call establishment and is common to all the cells pertaining to the same call.

The choice is determined in the different cases by the routing constraints through the geographic map and by the occupancy conditions of the connection network of the node.

The structure which carries out the cell switching effects a label conversion, which has only local validity in each trunk between two adjacent nodes, and the routing of the cells pertaining to the same call towards the convenient output through the connection network.

The connection network, which has the task of spatially switching the cells from an input gate to the output gate, must be capable of carrying high-traffic volumes, of the order of some hundred Gbit/s, with low cell loss probability and low call blocking probability. In addition, the connection network must present a minimum transit time and easily adapt to possible modular growth.

It follows that while defining the requirements of an ATM switch, one of the parameters which is to be taken into account is its capacity in terms of bandwidth.

An ATM network in fact will be required to carry very wide band services such as videoconferencing, high bit-rate data transfer, data and image transmission for CAD/CAM applications or multimedia services, and possibly broadcast type services (HDTV).

However, the increasing band request is neither limited, nor stringently dependent on the introduction of new applications and services, for which time and level diffusion are not easy to forecast, but it is due to the increasing speed of local networks (LAN) and to their evolution towards high bit rate integrated LAN which, based on the availability of a physical means such as the optical fiber, are capable of generating high bandwidths that the public network will then be expected to switch.

ATM exchange is then requested to control flows carrying a bandwidth varying from 0 to a maximum which is presently of the order of at least 700 MHz (derived from experimental results referred to in the literature).

Such a requirement is reinforced by estimates which agree in establishing that, in order to allow a better statistic multiplexing, ensure the best performances for burst traffic and provide the minimum connection blocking probability, the switching structure is to dispose of a bandwidth per flow equal to several times that required by the individual service.

In this light the implementation of a switching structure capable of switch inputs at a rate of 700 Mbit/s becomes significant.

A technology which has become increasingly interesting for analogous studies and experimental investigations mentioned in the literature is CMOS technology. Such a technology has been already widely tested and is commercially available at reasonable costs.

The definition of an architecture of an exchange prototype capable of switching ATM flows with a bit rate of the order of 700 Mbit/s could envisage the use of extremely advanced and expensive technologies such as GaAs technologies, some bipolar technologies or least but not last, optical technologies. Such technologies, however, do not possess an integration capability sufficient to realise complex components, such as those now being investigated. In fact ATM switching technique requires high-capacity cell buffers, to which none of the cited technologies, even though with different nuances, appears to be suitable. Besides for a number of the technologies considered the considerable power dissipation is a serious constraint.

Among the known elements for ATM technique, there is the one described in the paper entitled "32×32 shared buffer type ATM switch VLSIs for B-ISDN" by Takahiko Kozaki et al, issued in the proceedings of ICC 91 Conference, Denver (USA), Jun. 23-26, 1991.

The described switching module can handle 32 input flows at a bit rate of 150 Mbit/s, supplying as many to the output, and is implemented in CMOS technology. The module architecture is that of a high capacity (4096 cells) shared buffer element, controlled in accordance with a linked list algorithm. By a suitable address control queues are formed within the unique shared memory. The main buffer memory consists of 8 integrated circuits, organized into a bit-slice scheme, according to which each circuit handles a bit of one of the 8-bit input words relevant to the 32 input flows. The control is carried out by two integrated circuits implementing the linked list algorithm and by two FIFO registers which store the addresses available in the main buffer. This switching module, even though it has low power dissipation, since it is implemented in CMOS technology, is rather cumbersome, since it needs the use of a plurality of integrated circuits to be mounted on a printed circuit board.

A solution for converting a 150 Mbit/s 32×32 module into a 600 Mbit/s 8×8 module is presented in the same paper. Control circuits are modified and some input/output multiplexers and demultiplexers are added, so as to share 600 Mbit/s input flow among four inputs.

A second solution is described in the paper entitled "A 400 Mbit/s 8×8 BiCMOS ATM Switch LSI with 128 On-Chip Shared Memory" by Shigeru Tanaka et al., published in the proceedings of ISSCC 91 conference, San Francisco (USA), Feb. 15, 1991. Also in this case the module dealt with is a switch module with shared buffer memory and control carried out according to the list algorithm. It allows building up by a unique integrated circuit a 400 Mbit/s 8×8 switching module in a rather expensive BiCMOS technology, a hybrid bipolar and CMOS technology. The parallelism of the 8 input flows is 4 bits and the buffer has a 256 cell capacity. Circuit dissipation is about 6 W at the typical 100 MHz frequency and the input/output gates demand ECL level signals.

Another solution has been presented in Italian patent application n. 68059-A/89, filed on Nov. 30, 1989 in the name of Italtel, Società Italiana Telecomunicazioni. The switching element described herein operates at 150 Mbit/s and has a structure with shared memory buffer, wherein output queues are controlled by a circuit using CAM (Content Addressable Memory) memories. This type of control structure however poses more serious implementing problems from the technologic point of view, in case of high frequency operation.

OBJECT OF THE INVENTION

It is an object of the invention to overcome the foregoing and other problems by providing an improved high bit rate cell switching element which is integrated into a unique component fabricated in CMOS technology, is cost-effective, has low power dissipation and operates at bit rates higher than 700 Mbit/s.

SUMMARY OF THE INVENTION

The object is achieved with a high bit rate cell switching element in CMOS technology which comprises:
  input buffers through which input cell groups, a time base signal and a synchronism signal are received;
  a register block or unit comprising a register wherein the groups are temporarily stored for synchronization purposes on the basis of synchronism signal and the time base signal;
  an operative part which receives the synchronized groups and, through a rotation memory, parallels the 8-bit input cells and stores them into a shared memory to resolve access conflicts to the same output by different cells, while at the output it executes the inverse operations so as to recover 8-bit words carrying out also the address storage in the shared memory;
  a control part, which generates writing addresses in the shared memory for input cell storage, analyses the routing labels of said cells and controls the switching proper, generating the reading addresses, sends to the operative part decoding signals for reading and writing in a memory block and exchanges with said block empty cell information and a routing label and sends control signals for scanning input connections and the synchronization;
  a timing signal generator consisting of a counter which generates suitable multiples of the elementary period, correspondent to input bit cycle, after being started by suitable signals, and generates starting and timing signals for the control part;
  a block comprising a register wherein the output groups are temporarily stored for synchronization purposes on the basis of the time base signal; and
  an output buffer through which output cell groups, a time base signal and a synchronism signal are emitted.

The operative part can comprise:
  a rotation memory, consisting of two planes, which alternately operate by receiving the cells at their inputs and emitting them at their outputs with a shift operation on the lines and by sending the cells subdivided into fractions to said shared memory and receiving them with a rotation operation of the locations belonging to each column;
  a first multiplexer which transfers to its outputs the flows arriving from either memory planes as a function of a first clock signal;
  a second multiplexer which transfers to an output the cells subdivided into fractions arriving from either memory plane as a function of a second clock signal obtained by inverting through a gate the first clock signal;
  a register, which transfers to an output the subdivided cells received from said second multiplexer at the suitable instants;
  an output block, which transfers the data from the shared memory to the memory planes, modifies the first cell bit, alternating 0 and 1 according to whether outgoing cell occupies an odd or even frame position, and carries out the routing label rotation, on the basis of clock signals;
  the shared memory, consisting of a RAM memory in whose locations the cells subdivided into fractions are stored;
  a memory block consisting of two memory banks wherein the present and future addresses for the shared memory are stored;
  a first decoder which generates the reading addresses in the memory block on the basis of clock signals;
  a second decoder which generates the writing addresses in the memory block on the basis of signals supplied by the control part; and
  a register where the addresses supplied by the memory block are integrated with less significant bits and sent to said shared memory.

The control part can comprise:
  a read-only memory containing a microprogram for generating the addresses for the shared memory, which supplies microinstructions used partly or completely as writing signals for the memory block, as control signals for scanning input connections and the synchronization and as writing and reading commands in a pointer memory, the starting of the microprogram being controlled by the timing signal generating;

a third decoder which supplies the addresses for the read-only memory on the basis of a part of the microinstruction relevant to the future state and of signals relevant to the state of the cell, and supplies control signals, extracted from the microinstruction, after their suitable sampling and level adjusting;

an address processing block which comprises banks of registers wherein the addresses of the first cell, of the last cell and of the number of intermediate cells and the addresses of the free locations are stored for each output, and comprises banks of registers for the writing and reading addresses in the shared memory;

the pointer memory being microprogram initialized and updated on the basis of addresses and data supplied by the address processing block to which it sends the address pointers; and a fourth decoder which generates the reading and writing signals for the pointer memory, on the basis of commands contained in the microinstruction and of timing signals.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
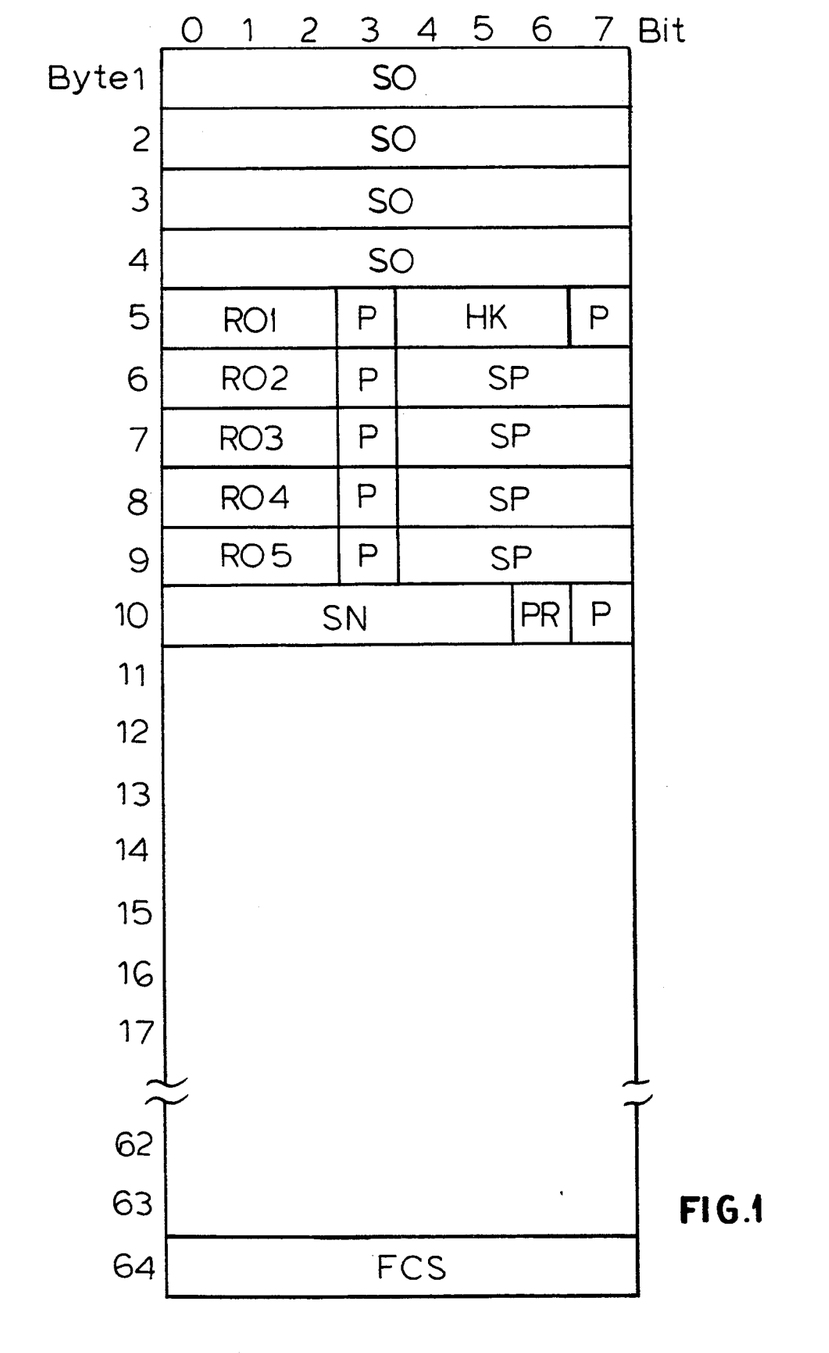
FIG. 1 is a diagram representing ATM cell format.

The ATM cell in the format inside the connection network, represented in FIG. 1, has a total length of 64 bytes.

The first four bytes, denoted by SO, form a synchronism word which allows a simpler and more direct achievement of the synchronization between serial-to-parallel and parallel-to-serial input/output converters and the connection network. In fact, it is sufficient that inside the switching module they replace the synchronism word used by the transmission means and are eliminated at the output, to keep the two portions of the system synchronous with the same clock frequency.

The internal format header contains then the five routing labels RO1, RO2, . . . , RO5 designed for elements belonging to as many stages of the connection network. The routing labels consist of 3 bits each and allow the use of the format defined to switching elements of an 8×8 size. The routing labels are protected by a parity bit P.

Field HK can contain additional information relevant to the type of cell to which it is assigned. It typically carries unassigned (empty) cell information and is protected by a parity bit P.

SP denotes spare fields.

Field SN and bit PR represent respectively the cell sequence number and relative priority; they too are protected by a parity bit P.

The 53 information bytes, forming ATM cell in the external format, i.e. in the cell format before entering the switching node such as defined by CCITT, come next. A data packet having a different meaning, as a function of the desired application, could also be carried.

The last cell byte, named FCS, allows detection of possible errors in the non-varying part of the cell itself by the use of a cyclic redundancy code.

Figure 2:
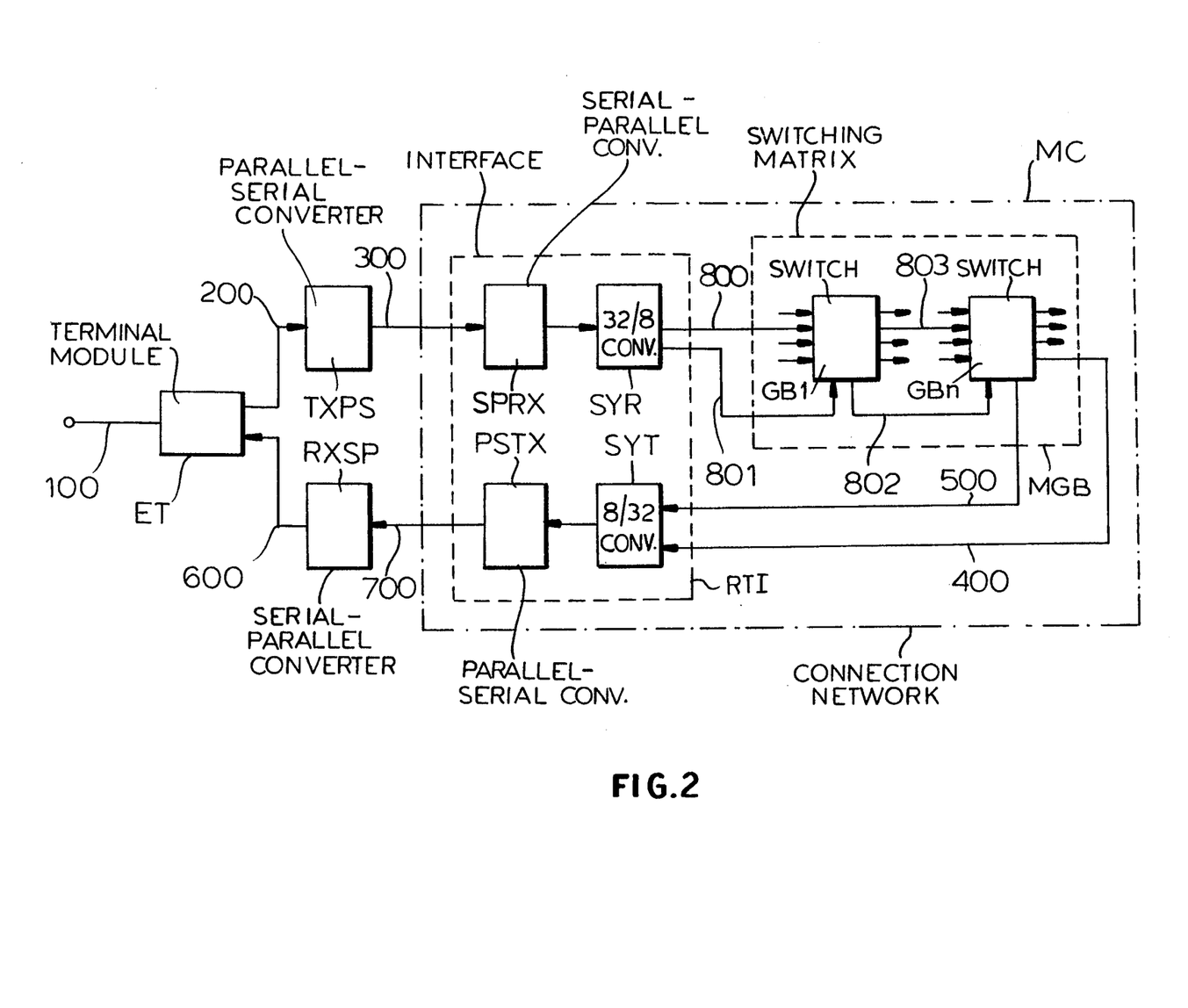
FIG. 2 is a block diagram of the switching using the element provided by the invention.

FIG. 2 shows the functional block diagram of a possible switching structure wherein the cell switching element can be inserted.

ATM flow transiting on connection 100 arrives at a termination module ET, which carries out the following main functions:

it receives the ATM frame to be switched, organized in accordance with the format defined by the synchronous transmissive standard (SDH=Synchronous Digital Hierarchy) at about 622 Mbit/s and carries out the function of transmissive termination designed to extract the useful information transported (Payload);

it processes the above-mentioned useful information at a bit rate of about 600 Mbit/s, adding in the first ten bytes of the cell the information necessary to the routing inside the connection network, consisting of a plurality of modules of the type denoted by MC;

in the absence of actual useful traffic at the input (absence of payload) it inserts cells which do not carry actual information, i.e. empty cells in internal format, in order to keep the system synchronous;

it carries out the dual functions of conversion from the internal cell format into CCITT format and of transmission on connection 100.

The ATM cells, in internal format, are then sent via parallel connection 200 towards block TXPS which carries out the parallel-to-serial conversion and the serial transmission on channel 300 (coaxial cable or fiber) which interconnects the termination part to the module of the connection network MC.

Each module MC of the connection network is subdivided into an interfacing part RTI with serial high rate communication functions and into a matrix MGB of switching elements GB1, GB2, . . . , GBn.

The interfacing module RTI consists, for the input part, of:

a block SPRX, which receives the flow on serial connection 300 and converts it into parallel format, e.g. 32 bits, extracting and generating the cell synchronism information;

a block SYR, which, using the above-mentioned synchronism information, carries out the cell alignment to the cell time base and generates on connection 801 a signal detecting the beginning of each cell. Block SYR carries out also the format conversion from 32 to 8 bits, at the bit rate of about 90 Mbit/s, to render it compatible with input gates 800 of the switching elements GE1, . . . , GBn.

For the output part, the interfacing module RTI consists of:

a block SYT, which converts 8-bit parallel format, received on connection 400, into 32-bit format, receiving on connection 500 the cell synchronism information;

a block PSTX, which carries out the function of conversion into serial format of the flow received from block SYT and of transmission on serial channel 700.

Block RXSP, placed outside module MC, carries out the functions inverse to those carried out by the already-described module TXPS. RXSP receives the serial flow on channel 700 and converts it into parallel form on connection 600 for output block ET.

Switching module MC contains also a switching matrix MGB, consisting of a certain number (8, 16 or 32) of switching elements GB1, GB2, ..., GBn, provided by the invention, equipped with four 8-bit inputs and with an equal number of 8-bit outputs. The elements are mutually interconnected through input and output connections so as to realize a part of a multistage connection network, in which they are grouped into columns or stages. Besides the four data inputs 800, 803, each element is equipped with an input for the cell synchronism signal 801, 802. The elements pertaining to the first stage receive their input flows from a correspondent number of blocks RTI, more particularly from their internal blocks SYR. The other stages of switching elements receive ATM flows and cell synchronism information from similar elements belonging to preceding stages.

Each element generates in turn four outgoing flows on 8 wires and synchronism information either for equal elements belonging to subsequent stages or, in case of elements pertaining to the last stage of matrix MGB, for an equal number of output blocks RTI, more particularly for blocks SYT.

Each switching element also receives a clock signal at about 90 MHz.

The basic functions which are carried out by a shared memory switching element GB1, GB2, ..., GBn, provided by the invention, consist of:
  a parallelism conversion of each flow at the element input from an 8-bit format to a 128-bit access format to the shared memory;
  the opposite conversion to the previous one from 128 to 8 bits of the datum outgoing from the shared memory towards the element output connections;
  a temporary storage function of the data simultaneously reaching the switching element, so as to allow an efficient transfer of the information into the shared memory, and therefrom towards the outputs;
  the storage of the cells into the shared memory, i.e. a read/write memory with 128-bit input/output parallelism and a capacity, which meets the requirements in terms of probability of cell lost due to the saturation of the space available in the temporary memory;
  the function of elimination and insertion of the cells which are not assigned to any connections, the so called "empty cells";
  a function of handling the routing label;
  a control function of the sequence of the accesses to the shared memory, so as to realize the cell switching proper; and
  a management of the internal synchronism and the generation of time base of the element starting from the system synchronism signal.

The first four functions are realized by means of a single structure, referred to here as a rotation memory. Such a structure can be conceptually assimilated to a double matrix of dynamic registers shifting in both directions.

The memory cell length is of 64 bytes, what allows the generation of time base signals inside the switching structure through a simple division of a fundamental clock signal.

Figure 3:
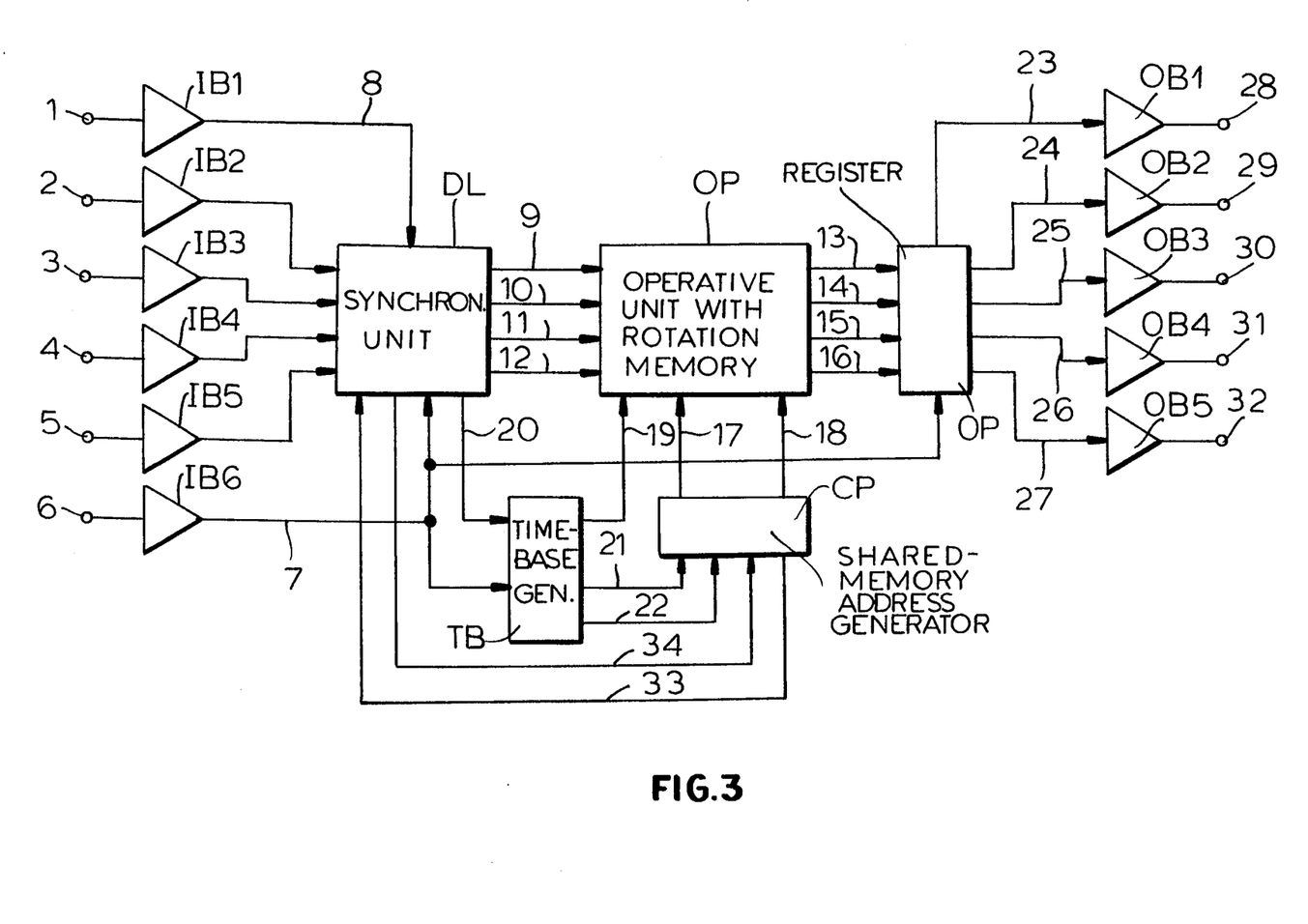
FIG. 3 is block diagram of the switching element provided by the invention.

The operational block diagram of the switching element GB1, GB2, ..., GBn, is represented in FIG. 3. The element receives:
  ATM cells through 4 groups of 8 bits each, denoted by 2,3,4,5, at the bit rate of about 90 Mbit/s;
  a 90 MHz clock signal, with duty cycle of 50%, on wire 6; and
  a synchronism signal, which can arrive on wire 1 either from the module interface RTI (FIG. 2), or from a previous switching element.

The input groups are forwarded by buffers IB2,IB3,IB4,IB5 to a block DL, where they are stored temporarily for synchronization in a suitable register. This is clocked by the internal time base signal, supplied on connection 7 by a buffer Ib6, and by the synchronism signal, supplied on connection 8 by another buffer Ib1. The aim of these buffers is simply that of ensuring an adequate input driving.

ATM groups outgoing from DL are successively sent through connections 9,10, 11,12 to a block OP, forming the operative part of the element. This block contains the above-mentioned rotation memory, which further parallels the input cells through a conversion from 8 to 128 bits and stores them into a shared memory, whose aim is that of resolving the access conflicts at the same output by different cells. At the output it carries out the inverse operations so as to obtain again 8-bit words on connections 13,14,15, and 16. The 512-bit cell, subdivided into four 128-bit fourths, is stored in the shared memory in four contiguous locations.

Besides the rotation memory and the shared memory, the operative part OP also comprises an address storing structure.

The generation of the shared-memory addresses for writing as well as for reading operations is controlled by a block CP. This is the control part which supplies the writing addresses, wherein to store the cells coming from input connections 9,10,11,12 after the format conversion, which analyses the routing labels of such cells and which controls the switching proper, defining which cells are to be sent to the outside.

Since the storing operations are executed by fourths of a cell, the significant address wires, grouped in connection 17, are 7, since the two least significant address wires indicate only what cell fourth is dealt with and are directly controlled in the operative part OP by the address storing structure.

Control part CP uses the "linked lists" principle, as described by way of example in the paper entitled "A shared buffer memory switch for an ATM exchange" by Hiroshi Kuwahara et al, issued in the Proceedings of ICC89, Jun. 11–14, 1989, Boston, pages 118–122, to efficiently address the shared memory, so as to realize the outputs queues by avoiding the use of five 7-bit 80-word FIFO memories. It is realized by means of a microprogrammed ROM which controls a part of data processing of 7 bits (the addresses for block OP). A small RAM memory contains the address pointers. Besides the addresses, it sends to the operative part OP on connection 18 the decoding signals for writing and reading into the address storage structure.

The control part CP exchanges information with block DL on connections 33 and 34. More particularly, it receives on connection 34 the "empty cell" information and the routing label and sends onto connection 33 control signals for scanning the input connections and for synchronization.

The circuit operates synchronously on the basis of timing signals which are locally generated by a block TB. This block basically consists of a counter which generates all the signals useful to the circuit, starting from the time base signal with a period equal to bit time, equal to 11 ns, present on wire 7. The signals generated are suitable multiples of the elementary period, corresponding to the input bit cycle: more particularly, the multiples 2,4,8,16,32,64, the latter coincident with cell time, and 128. All these signals are sent to block OP by means of connection 19. An internal synchronism signal generated by block DL on wire 20 starts the counter of block TB.

Block TB generates also the starting signal for the microprogram and 45 MHz timing, which clocks the circuits contained in the control part CP, by transferring them on wires 21 and 22 respectively.

The cells, once read in block OP, are caused to shift towards the output with the same input parallelism, i.e. four 8-bit flows, and are sent through connections 13,14,15,16 to a register OL to synchronization.

This register OL makes available the flows switched onto the output connections 24,25,26,27 and generates on wire 23 an output synchronism signal. These connections reach as many buffers OB2,OB3,OB4,OB5,OB1, as are necessary to ensure a suitable output drive by supplying ATM flows and synchronism signal on connections 29,30,31,32 and 28, respectively.

Figure 4:
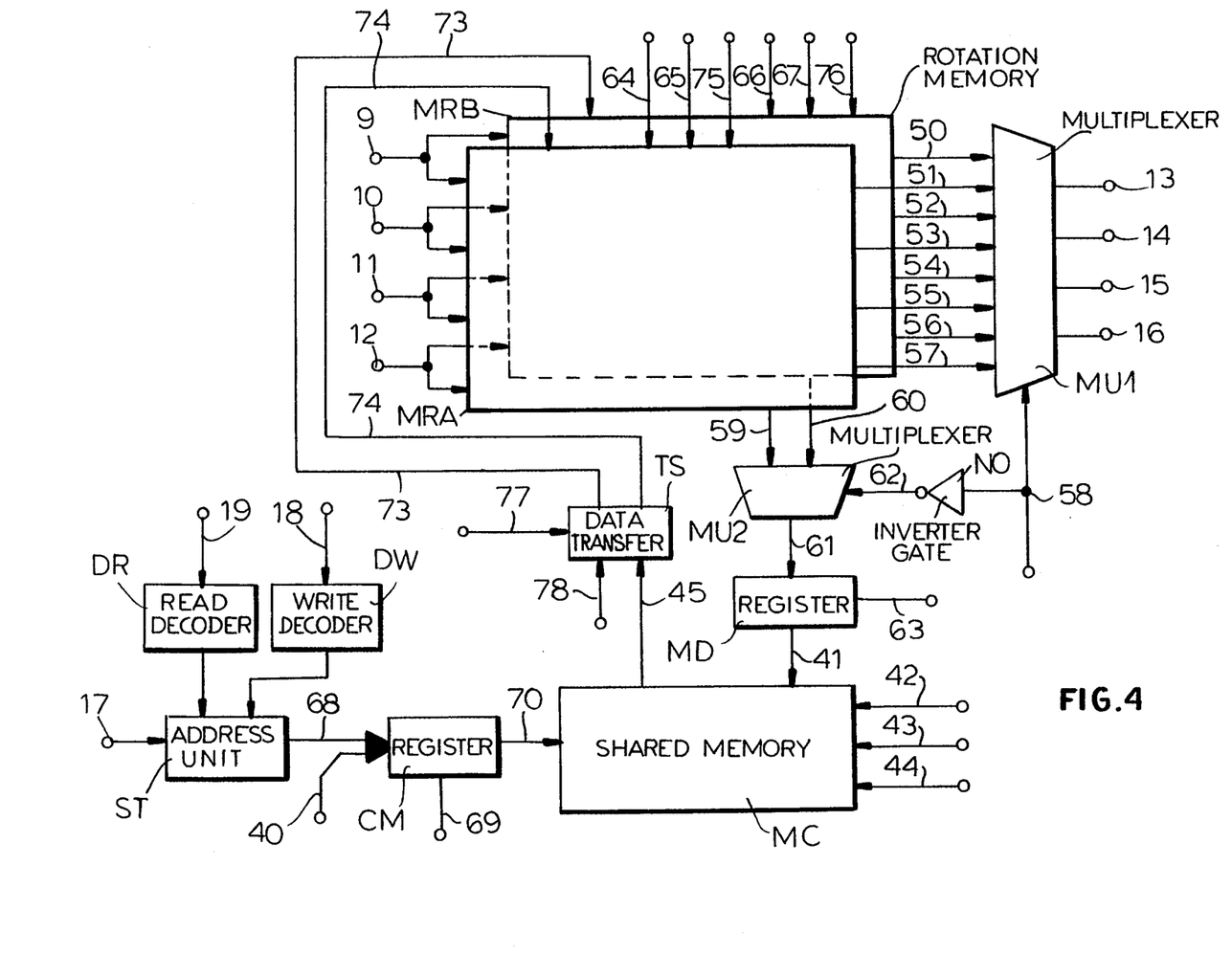
FIG. 4 is a block diagram of the block denoted by OP in FIG. 3.

Block OP is represented in grater details in FIG. 4. In it there are the three fundamental blocks, duly interfaced:

the rotation memory, consisting of two equal planes MRA and MRB;

the address storage structure ST; and the shared memory MC.

As mentioned, the memory MRA, MRB allows the adjustment of input and output format of the data arriving from the input connections 9,10,11,12 to load them into the shared memory MC through connection 41 and subsequently to read them therefrom through connection 45 and route them towards the output.

The two planes MRA and MRB operate alternately so as to carry out a shift of the incoming data on connections 9,10,11,12 and outgoing on connections 13,14,15,16 and a rotation for loading and unloading the cell subdivided into four 128-bit fractions, towards MC.

While the data stored in a plane, e.g. MRA, shift in horizontal direction on the same line from inputs 9,10,11,12 towards outputs 51,53,55,57, the data of the other plane MRB are transferred from and towards the memory MC, with a trend similar to an operation of rotation. This operation occurs by transferring the contents of each location of plane MRB into the adjacent location belonging to the same column, the contents of the location close to the output being sent on connections 59 or 60 towards memory MC. Analogously, the location close to the rotation input receives on connections 73 and 74 the data for the element output.

The operations in planes MRA and MRB alternate at each cycle, equal to a fourth of the cell time, that is why 2 multiplexers are needed. A multiplexer, denoted by MU1, transfers to the output either the flows on connections 50,52,54,56 coming from MRB or the flows on connections 51,53,55, 57 coming from MRA, in function of the clock signal present on wire 58.

The other multiplexer MU2 transfers the fourths of cell present on connections 59 or 60, coming from MRA or MRB, towards the shared memory MC through connections 61 and 41 and a transfer register MD. The latter register transfers data upon control of clock signal with a period of 22 ns, on wire 63 at suitable instants. The switching signal for multiplexer MU2 is supplied on wire 62 by a gate NO, which inverts the signal on wire 58 used for switching MU1, so as to respect the alternation of shift and rotation operations.

The signals on wires 64 and 66 are clock signals with a period equal to 11 ns bit period, signals on wires 65 and 67 are signals enabling data shifting from and to memory MC and those on wires 75 and 76 are signals enabling data shifting from the input to the output, with a duration equal to 16 clock cycles so as to allow the loading of a fourth of cell. Since the operations in MRA and in MRB alternate at each cycle, the signals above enable in alternate phases the two planes, in the sense that when MRB is enabled towards the output (MRB shifts), MRA is enabled towards the shared memory (MRA rotates) and vice versa in the subsequent cycle.

Block TS allows data transfer from memory MC to two memory planes MRA, MRB, modifying at the same time the first bit of the cell, which is the synchronism bit, so as to obtain alternately 0 and 1 according to whether the cell presented to the output occupies an odd or even position in the frame. TS rotates also the routing label. In fact, for each outgoing cell the label updated for the future switching stage is to be put in the first position carrying out a rotation of the five labels, one per stage, contained in the bytes between the 5th and the 9th of the cell. The enabling to the rotation and the signal for updating the first bit of the cell, with half-period equal to the cell time, are supplied by the time base on wires 77 and 78 respectively.

The address storage structure is to supply the shared memory MC with write and read addresses. It comprises a block ST housing 2 memory banks, one for current addresses and the other for the future addresses, each formed of eight 7-bit latches, four containing the write addresses and four the reading addresses, one per each input flow. Such addresses are written by the control part on connection 17 and made available on connection 68, each 4 times with a period equal to a fourth of the cell time.

Block ST carries out a "pipeline" function between the control and the operative part, allowing the decoupling of the address preparatory phase from their using.

The decoder for writing in ST, denoted by DW, operates on the signals supplied by the control part CP (FIG. 3) on connection 18, while the decoder DR for read scanning operates on the signals supplied by counter TB (FIG. 3) on connection 19.

Further to the 7 bits cited, present on connection 68 (FIG. 4), there are on connection 40 the two least significant bits, identifying the location of the fourth of the cell. They are recorded by a register CM, controlled by a clock signal with period equal to twice the bit time, present on wire 69, and sent to the shared memory MC through 9 wire connection 70.

The shared memory MC is a static RAM of 320 128-bit words, wherein the cells are stored at subsequent fractions of ¼ through connection 41; as a consequence, the element above can contain 80 cells. Among these, the empty cells is comprised, wired in the last 4 locations of the above-mentioned memory.

Seven address wires, belonging to connections 17, are sufficient for reaching the cells, since the two least significant bits, present on connection 40 coming from the time base, address one of the fourth of cell.

The signals on wires 43 and 44 enable the writing or reading in MC, while the signal on wire 42 is a signal allowing inhibition of column pre-loadings and reduced power consumption. The first two are obtained from time base signals and that on wire 42 is directly controllable from the outside of the integrated circuit.

Figure 5:
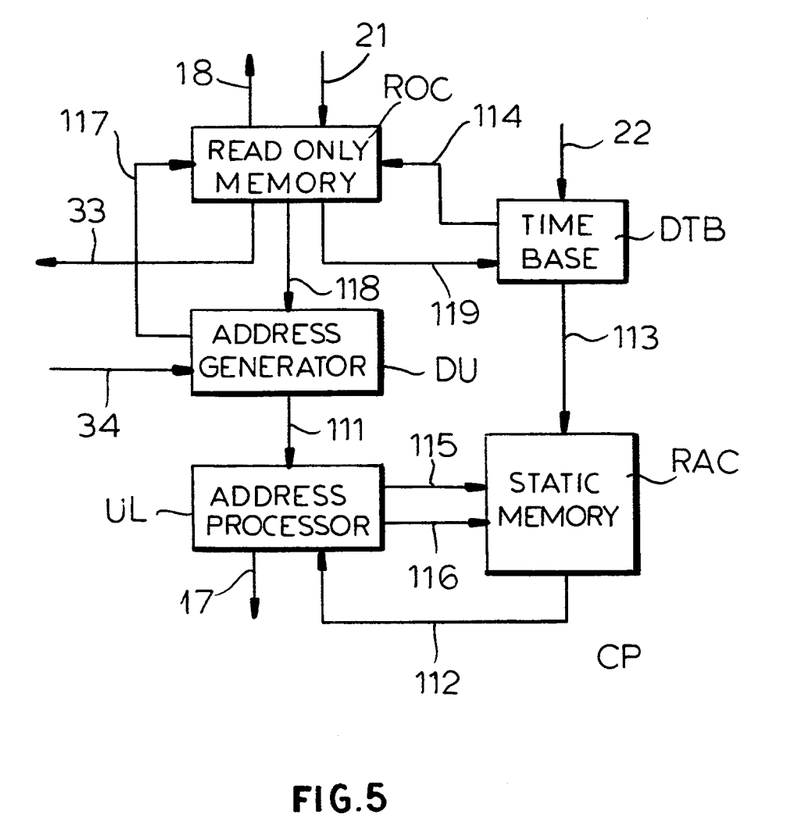
FIG. 5 is a block diagram of the block denoted by CP in FIG. 3.

The control part, denoted by CP in FIG. 3, is shown in FIG. 5. It controls the generation of the addresses of the shared memory MC (FIG. 4) so as to allow the correct routing of the cells and to ensure their emission with the correct arrival time order, compatibly with the routing labels contained in the cells themselves.

It uses a "linked list" structure, which provides as many lists as the output channels, plus one containing the addresses of the empty locations in shared memory MC, wherein the cells entering the module can be stored.

These lists represent the time schedules, or queues, of the cells which, after being stored in the switching element, request to go out on a determined channel. They are obtained by controlling a single RAM memory, the pointer memory.

The address of a cell, written in the shared memory MC (FIG. 4) and intended to be made to queue in a certain schedule of an output channel, can be chosen indifferently among any one of those corresponding to the same number of free locations of the pointer memory. The time order of the cells is maintained through the list structure. In fact in each word of the pointer memory, which corresponds unequivocally to a location of the shared memory, the control writes the address (i.e. pointer) of the cell which occupies the next position according to the order of the associated queue. In addition to the number of lists relevant to the outputs it is necessary to create a further list correspondent to the free locations in the shared memory. The latter is used to determine the location wherein the incoming cells are to be store.

in the block diagram of FIG. 5, it is to be noted that the control part uses a microprogrammed automaton, implemented through a read-only memory ROC, controlling a part UL for processing the addresses.

The microprogram instructions contained in ROC consist of 55 bits organized in 20 fields with well separated functions, so as to obtain maximum efficiency in terms of execution speed. The read-only memory ROC receives the addresses on connection 117 from block DU, which processes them on the basis of the future state field and of the condition bit coming from connection 118 and of signals coming from connection 34 (signal of empty cell, label, etc.). The operations are carried out at the 45 MHz clock frequency, so as to complete a whole microinstruction cycle, executing the relevant addressing, in 22 ns.

At the same time, memory ROC renders the data, contained in a suitable microinstruction field, available on connection 33, which data are the already-cited control signals for block DL (FIG. 3).

Memory ROC receives two timing signals on connection 114 arriving from block DTB. The latter receives on connection 22 from block TB (FIG. 3) a 45 MHz clock signal and generates two signals at the same frequency, but with different duty-cycles. Said signals allow a correct and fast line and column addressing of memory ROC.

Block DTB decodes also the microinstruction field relevant to writing and reading commands of the block RAC, received through connection 119, generating relevant signals on connection 113.

Block RAC is a static memory consisting of eighty 7-bit words, which form the address pointers as defined by linked list algorithm. It is initialized by the microprogram by loading in each location the next address from 1 to 78. Its contents is updated during the microprogram execution according to linked list algorithm, on the basis of the addresses present on connection 115 and of the contents to be written, processed by block UL, present on connection 116. In the reading phase, memory RAC emits on connection 112 the contents of the location addressed by the address present on connection 115.

Block UL processes the addresses of the shared memory MC (FIG. 4), supplying them on 7-bit connection 17. It uses control signals, extracted from the microinstructions, it receives from decoder DU on connection 111, after their sampling and level adjusting.

UL comprises three bank of registers. The bank contains the address of the first cell which has requested to go towards a certain output channel, another contains the address of the last cell to request to go towards the same channel, the third contains the number of cells comprised in the queue in between the first cell and the last. The linked list algorithm allows all the intermediate addresses to be recovered.

Each bank consists of five registers, one per each queue, i.e. four registers for the four output channel and one for the free locations. Moreover, there is a counter which updates for each queue the number of cells whose destination is to an output channel. The counter is shared among five queues, since the microprogram examines them separately.

During a complete microprogram cycle, i.e. for the cell time duration, control part CP computes four writing addresses in the shared memory MC (FIG. 4), for the cells entering the element, and four reading addresses in the same memory, for the outgoing cells. Said eight addresses are stored in eight further UL registers, to be then sent to the operative part, namely block ST of OP (FIG. 4) at the suitable instants.

Finally there are three output registers, for supplying the signals described on connections 17, 115 and 116. The internal registers dialogue with one another on three shared buses.

The described switching element is characterized by a minimum crossing time equal to a cell time. This ensures that a cell entering the element may be present on the outputs in the next cell period.

The low power dissipation, about 1,2 W at 90 MHz, is obtained thanks to the extensive use of dynamic logics (rotation memory MRA,MRB; microprogram memory ROC), of static memories (shared memory MC, pointer memory RAC) equipped with null static dissipation sense amplifiers and with input and output buffers (Ib1 ... Ib6, OB1 ... OB6) with reduced dynamics ranging between 0 and 1 Volt.

We claim:

1. A high bit rate cell switching element in CMOS technology, comprising:
 a multiplicity of input buffers receiving input cell groups, a time base signal and a synchronism signal;

a synchronization block comprising a register and connected to said buffers and wherein the groups are temporarily stored for synchronization purposes, the temporary storage for synchronization purposes being controlled by the synchronism signal and the time base signal, said synchronization block outputting synchronized groups;

an operative part connected to said synchronization block and receiving said synchronized groups, said operative part having a rotation memory capable of paralleling 8-bit input cells and storing them into a shared memory for resolving the access conflicts to an output by different cells, said operative part having an output and executing inverse operations including recovering contents of the shared memory to recover 8-bit words as output cell groups, said operative part carrying out an address storage in the shared memory;

a control part forming part of the shared memory and connected to said operative part and generating writing addresses in the shared memory for input cell storage, analyzing routing labels of said cells and controlling switching thereof, said control part including:
  means for generating reading addresses,
  means for sending to the operative part decoding signals for reading and writing in a memory block,
  means for exchanging empty cell information with said synchronization block and for exchanging a routing label with said synchronization block, and
  means for sending control signals for scanning input connections and the synchronization;

a timing signal generator connected to said operative part and in said operative part to said shared memory, said timing signal generator comprising a counter which generates suitable multiples of an elementary period corresponding to an input bit cycle, after being started by a signal, and generating starting and timing signals for the control part;

a register block connected to said output of said operative part and comprising a further register wherein said output cell groups are temporarily stored for synchronization purposes controlled by the time base signal; and output buffers connected to said register block and through which said output cell groups are emitted.

2. The cell switching element defined in claim 1 wherein
  said rotation memory comprises two planes, which alternately operate by receiving cells at respective inputs and emitting cells at respective outputs with a shift operation on the lines of said planes and by sending the cells subdivided into fractions to said shared memory and receiving the cells from the shared memory with a rotation of locations in a common column of the respective planes, said operative part further comprising:
  a first multiplexer connected to said rotation memory and which transfers to outputs of the first multiplexer flows arriving from either of said memory planes as a function of a first clock signal;
  a second multiplexer connected to said rotation memory and which transfers to an output of said second multiplexer cells subdivided into fractions arriving from either of said memory planes as a function of a second clock signal obtained by inverting through a gate said first clock signal;
  a transfer register connected to said output of said second multiplexer which transfers to an output of said transfer register the subdivided cells received from said second multiplexer, said transfer memory being connected to said shared memory;
  an output block connected between said rotation memory and said shared memory, which transfers data from the shared memory to said memory planes, modifies a first cell bit alternating 0 and 1 according to whether an outgoing cell occupies an odd or even frame position, and carries out a routing label rotation controlled by clock signals;
  said shared memory consisting of a RAM memory in whose locations cells subdivided into fractions are stored;
  a memory block consisting of two memory banks wherein present and future addresses for said shared memory are stored;
  a first decoder connected to said memory block and, which generates reading addresses in said memory block controlled by clock signals;
  a second decoder connected to said memory block and, which generates writing addresses in said memory block in response to signals supplied by the control part; and
  a further register between said memory block and said shared memory where addresses supplied by the memory block are integrated with less significant bits and sent to said shared memory.

3. A cell switching element as defined in claim 1 wherein said control part comprises:
  a read-only memory containing a microprogram for generating addresses for said shared memory and supplying microinstructions for use as writing signals for said memory block, as control signals for scanning input connections and the synchronization, and as writing and reading commands in a pointer memory, the starting of the microprogram being controlled by said timing signal generator;
  a first decoder connected to said read-only memory and which supplies addresses for said read-only memory on the basis of a part of a microinstruction relevant to a future state and of signals relevant to the state of a cell, and which supplies control signals, extracted from the microinstruction, after sampling and level adjusting;
  an address processing block connected to said first decoder which comprises banks of registers where addresses of a first cell, of a last cell and of a number of intermediate cells and the addresses of free locations in the shared memory are stored for each output, said address processing blocks comprising banks of registers for the writing and reading addresses in said shared memory;
  the pointer memory being microprogram initialized and updated on the basis of addresses and data supplied by the address processing block to which it sends the address pointers; and
  a second decoder which generates reading and writing signals for said pointer memory on the basis of commands contained in the microinstructions and of timing signals.

* * * * *